United States Patent [19]
Patton et al.

[11] Patent Number: 5,559,870
[45] Date of Patent: Sep. 24, 1996

[54] METHOD AND APPARATUS FOR PROVIDING INFORMATION TO A SUBSCRIBER OVER AN ELECTRONIC NETWORK

[75] Inventors: Mark W. Patton, Alpharetta; Douglas W. Todd, Lawrenceville; Glenn A. Davis, Lilburn, all of Ga.

[73] Assignee: Scientific-Atlanta, Inc., Norcross, Ga.

[21] Appl. No.: 497,503

[22] Filed: Jun. 30, 1995

[51] Int. Cl.[6] .................................................. H04M 11/00
[52] U.S. Cl. .................................................. 379/107; 379/97
[58] Field of Search .......................... 379/102, 104–107, 379/93, 97–100, 67, 88, 89

[56] References Cited

U.S. PATENT DOCUMENTS 5,142,566  8/1992  Meschi ................................. 379/107
5,225,997  7/1993  Lederer et al. ........................ 379/106
5,408,523  4/1995  McEachern et al. .................. 379/107

*Primary Examiner*—Wing F. Chan
*Attorney, Agent, or Firm*—Steven C. Stewart

[57] ABSTRACT

A method and apparatus for providing information, such as power consumption, to a subscriber over an electronic network in response to commands provided by the subscriber. The apparatus includes a remote unit which detects and stores the power consumption information, a subscriber device, i.e., a telephone, for generating request commands and a control device which tracks the information. The subscriber using the subscriber device, feeds the request commands via the network to the control device. The control device responds to the commands by directing the remote unit to feed its stored power consumption information onto the network to the control device. The control device then processes the information and indicates the result back to the subscriber.

21 Claims, 5 Drawing Sheets

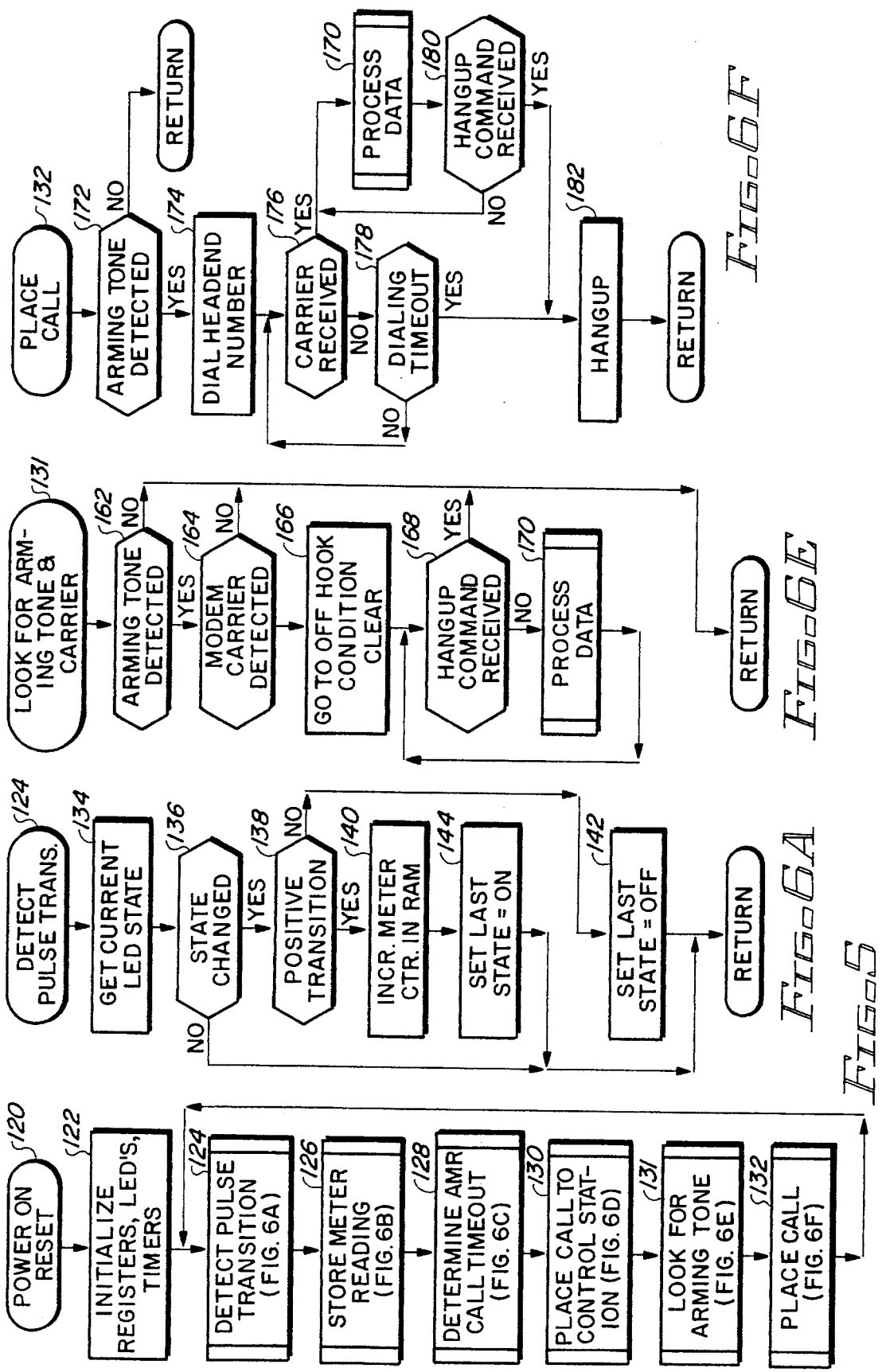

5,559,870

METHOD AND APPARATUS FOR PROVIDING INFORMATION TO A SUBSCRIBER OVER AN ELECTRONIC NETWORK

TECHNICAL FIELD

This invention relates to providing information over an electronic network, and more particularly to a method and apparatus that indicates information about utility consumption to a subscriber via a telephone network.

BACKGROUND OF THE INVENTION

Utility consumption is conventionally tracked using a meter that monitors subscriber consumption. The utility providers typically determine the subscribers consumption by sending a service technician to the meter location to read the meter. The technician reads the meter, and then has the recorded reading entered into a central computer. The computer then processes the entered readings and computes a billing statement for transmission to the subscriber.

Subscribers of utility providers such as electric power companies, typically receive a statement once a month indicating the subscribers utility consumption and a monthly figure for utility consumption, which is conventionally tracked using a meter that monitors such consumption. If the subscriber wants to know how much is owed to the utility providers before the statement is received, the subscriber must read the utility meter, and subtract the previous statement reading and perform a calculation by multiplying the subtracted result by the utility rate.

A drawback to this service is that for the subscriber to know what the utility consumption and cost has been since the last statement, the subscriber must read the utility meter when it is typically located outside of the subscriber's home. The subscriber must also have the latest rate tables, and the last meter reading which may or may not be provided on the monthly statement. The subscriber then multiplies the power consumption by the most recent rate to determine the cost. The rate tables may be dynamic as they may change with falling or rising fuel costs. These factors make it inconvenient to determine the utility consumption.

Various types of devices have been attached to the meter to simplify meter reading. These devices transfer meter data over a communications line, such as a telephone line to a central control unit. The meter data may then be recorded or used for billing purposes. These devices may not permit the subscriber to obtain the most updated billing information. Further, these devices may interfere with the subscribers normal phone line operation by interrupting, or controlling the phone line when the subscriber attempts to access the line.

SUMMARY OF THE INVENTION

An object of this invention is to provide an improved method and apparatus for distributing information to a subscriber over an electronic network;

An additional object of this invention is to instantaneously indicate to a subscriber over a telephone network utility usage;

A further object of this invention is to obtain utility usage information using a telephone by entering commands into the telephone and obtaining an automated voice response;

It is also an object to receive utility usage information into a central control device over a telephone network to substantially transparent to subscriber telephone usage; and Another object of this invention is to transmit audio signals that indicate power consumption billing to a subscriber in response to commands provided by the subscriber via a telephone key pad.

It is a further object to indicate to the subscriber the most up-to-date power and consumption information incorporating all utility company rate changes.

These and other objects are provided with an apparatus for indicating power consumption to a subscriber in response to commands provided by the subscriber. The apparatus has a remote unit that includes a sensor, detecting power readings of an electronic power meter, and a transmitter providing the detected power readings onto the network. The apparatus also has a control device that includes a receiver receiving commands provided by a subscriber and receiving the provided power readings from the network, a computer computing a power consumption value in response to the received power readings, and an indicator circuit responsive to the computer and providing the computed power consumption value onto the network to the subscriber.

BRIEF DESCRIPTION OF THE DRAWINGS

FIG. 5 is a general flow diagram of a sequence of steps processed by the microcontroller that is shown on FIG. 2;

FIG. 6A is a flow diagram of the process steps implementing a detect pulse transition by the microcontroller;

FIG. 6E is process steps implemented by the microcontroller to detect an arming tone;

FIG. 6F is process steps implemented by the microcontroller to place a call to the control unit;

DETAILED DESCRIPTION OF THE PREFERRED EMBODIMENT

Figure 1:
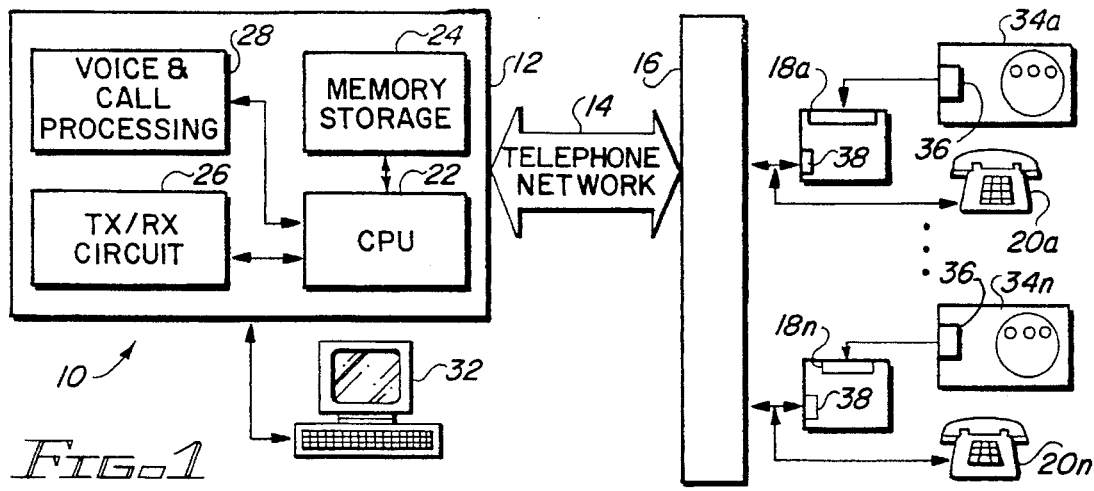
FIG. 1 is a system block diagram of a control device connected to a multiplicity of remote units and telephony over a telephone network.

Referring to FIG. 1 there is shown a system diagram 10 of an automatic meter reading system having a control device 12, generally referred to as a headend, connected through telephone line or network 14 and telephone exchange 16 to a plurality of remote units 18a–18n and subscriber telephones 20a–20n.

Control device 12 includes a Central Processing Unit (CPU) 22 connected to memory device 24, control device transmit/receive 26 also returned to as circuitry and voice processing/call processing circuit 28. Call processing circuit 28 generates an audio message for distribution onto network 14. Circuitry 26 includes a modem which preferably complies with Bell standard 202. CPU 22 computes a power consumption value and generates a power reading request command. This command is fed through the control device circuit 26 to network 14. Voice and call processing circuit 28 is preferably a Dialogic card manufactured by Dialogic Inc. Modem (not shown) is generally known in the art. One such modem is available from Universal Data Systems of Huntsville, Tenn.

Circuit 28 receives commands and power readings from the remote units 18a–18n and transmits power readings to CPU 22. Circuit 28 also transmits commands and requests to subscribers 20a–n via network 14. Circuit 28 in response to commands from CPU 22 by providing power consumption values to subscriber telephones 20a–20n via a telephone line, herein referred to as network 14.

CPU 22 feeds the resulting power readings to an external device 32 such as a monitor, printer, or other display device. The CPU 22 communicates with external device 32 via a local network to display information regarding subscriber power consumption or to generate bills which would then be mailed or electronically delivered to the subscribers.

Each of the remote units 18a–18n are connected to an electric power meter 34a–34n respectively having a rotating interrupter (not shown). These power meters 34a–34n indicate the power being consumed by each of the homes, offices or other facilities of the subscribers facility. A preferred meter 34 is type Mx available from Landis and Gyr of Lafayette, Ind.

Figure 2:
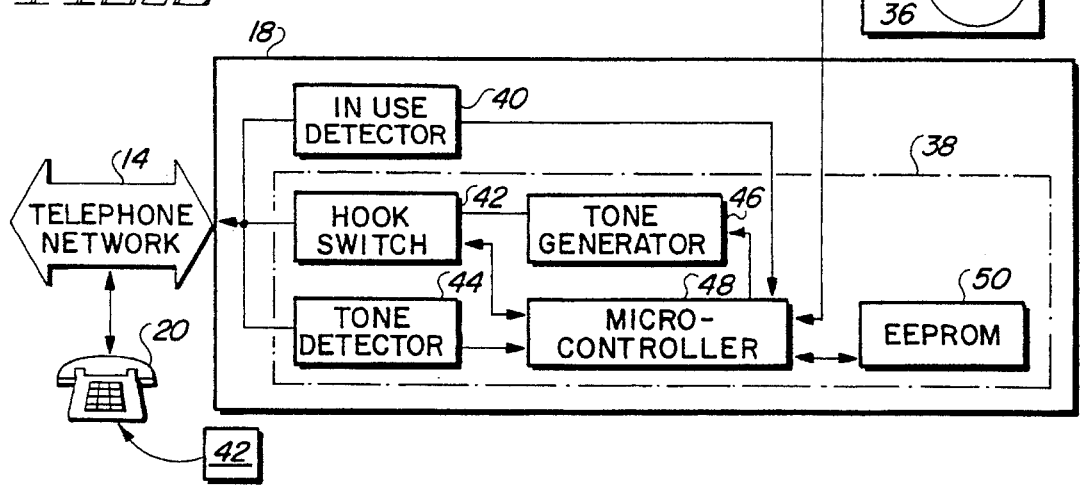
FIG. 2 is a simplified schematic diagram of a remote unit connected to a power meter, telephone network, and telephone.

Preferably meters 34a–34n each contain a pulse initiator sensor 36 which detects the rotation of interrupter to indicate energy demand on of the electric power meter 34. Sensor 36 feeds this energy demand in the form of electric pulse to unit 18. Returning to FIG. 2, Unit 18 is shown containing a microcontroller 48 within a transmitter circuit 38 which feeds the detected power readings of sensors 36 onto the network 14. Sensor 36 is preferably a pulse detector, Model number MCO71W1 manufactured by Motorola Inc. of Austin, Tex. Remote unit 18 is preferably built into meter 34, although it maybe external or remotely located from meter 34.

Remote unit 18 is connected to power meter 34 and network 14. Also connected to network 14 is subscriber telephone 20. Meter 34 contains a sensor 36 connected to remote unit 18. Remote unit 18 includes an in use detector 20 and a transmitter circuit 38.

Subscriber telephone 20 is operated by a user or subscriber and contains a keypad 42. Keypad 42 is depressed by a subscriber to feed tones onto network 14. Although a telephone 20 is shown to be used by a subscriber in communicating onto a network 14, other devices such as computers, voice-recognition devices, monitors, set-top terminals or home communications devices could be substituted for telephone 20 to communicate through the network 14 to control device 12.

Transmitter circuit 38 includes a microcontroller 48, EEPROM 50, in use detector 40, hook-switch 42 and tone detector 44. Microcontroller 48 generates tones outputs which are fed onto network 14. Tone detector 44 contains a high impedance amplifier and signal shaping circuit which signals microcontroller 48 the activity on lines 14. Tone generator 46 has an active filter which is used to post process tone outputs of Microcontroller 48 and provide the upstream communications between unit 18 and device 12. Microcontroller 48 communicates with circuit 26 in control device 12 using tone generator 46.

Hook-switch 42 contains a relay which provides a standard telephone off-hook and on-hook indication to network 14. Tone detector 44 senses tones fed onto network 14 at specific predetermined arming tone frequencies and provides an indication in digital form indicating frequency to microcontroller 48 when those tones are detected. The special carrier arming tones have a predetermined duration and indicate that the control unit 12 is ready to receive commands and data from the remote device 18. These arming tones line a cadence, duration and/or frequency which is not normally carried by the telephone network. An in use detector circuit 40 determines the network status by sensing the voltage on network 14 to determine whether subscriber 20 is "on-line" or "off-line". In response to the detection of network status 14 being "on-hook" or "off-hook", in use detector circuit 40 provides the network status indication to microcontroller 48.

During operation, pulse detector 36 senses rotation of interrupter on meter 34, and generates electronic pulses in response thereto. In response to the signals from pulse initiator sensor 36, microcontroller 48 sums these pulses and periodically adds the accumulation of pulses to values previously stored in EEPROM 50. Microcontroller 48 then updates, by replacing the values previously stored, EEPROM 50 with the total accumulated values, herein referred to as read meter values. Microcontroller 48 may contain a timer (not shown) which provides timing information about when to update the accumulated values. This timer generates an alarming signal to indicate to microcontroller 48 when to send these accumulated read meter values stored in the EEPROM 50 to control device 12. Microcontroller also responds to requests from device 12 by transmitting these saved accumulated values. Details of the operation is described in FIGS. 3–10.

Microcontroller 48 in combination with tone generator 46 emulate the Bell 202 modem protocol. This emulation is used to communicate with device 26 in control device 12.

Figure 3:
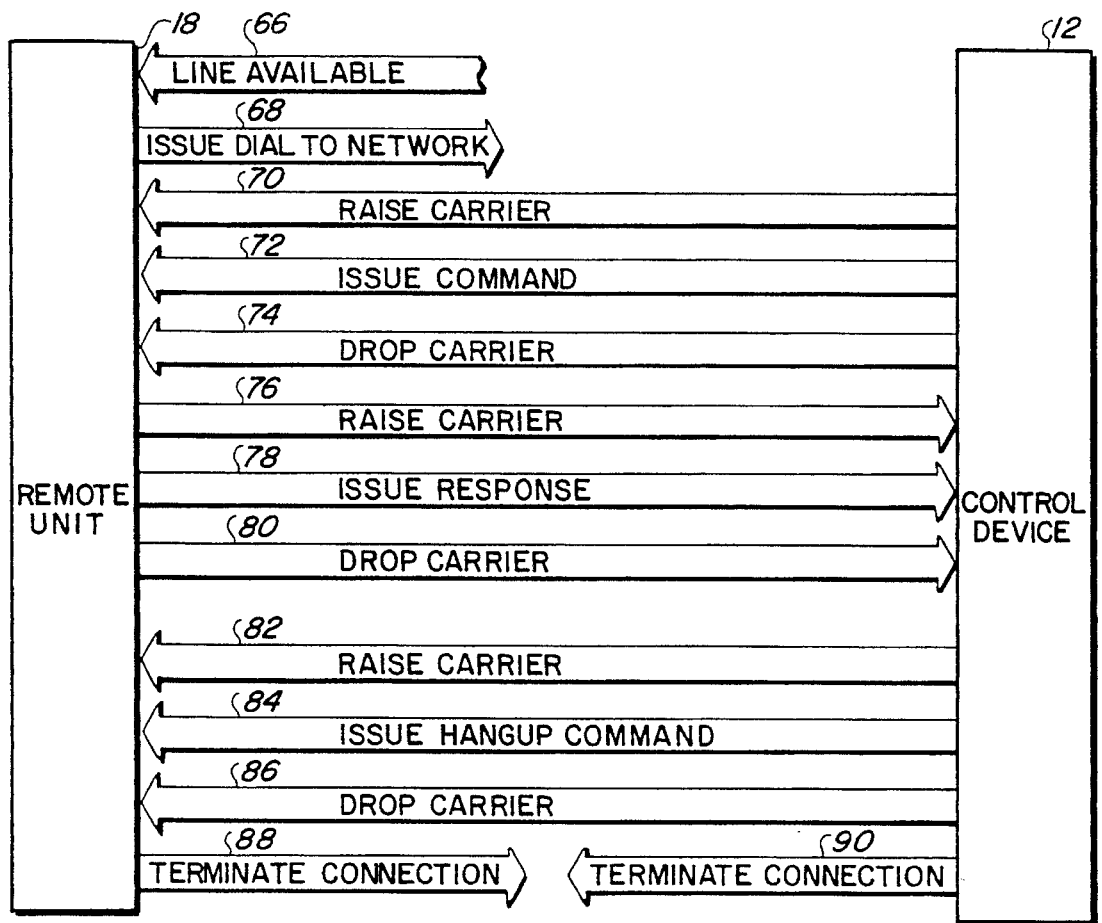
FIG. 3 is a diagram illustrating the protocol between the remote units and the control device during data transfer modes.

Referring to FIG. 3, there is shown a diagram illustrating a data transfer protocol (per Bell standard 202) between the remote unit 18 and the control device 12. This protocol is invoked when remote unit 18 initiates a transfer of information, i.e. meter reading data, to control device 12. In this mode, remote unit 18 checks in line 66 to determine if the network 14 is available for remote unit 18 to transmit information to control device 12. Upon determining that the line is available, remote unit 18 dials the control device 12 at a predetermined telephone number in line 68.

Control device 12 responds to remote unit 18 by raising carrier in line 70, and then issuing a command such as "send data" in line 72. Control device then drops carrier in line 74, and waits for a response from remote unit 18.

Remote unit 18 acknowledges the issued commands by raising carrier in line 76 and issues a response to the commands in line 78 by sending data or indicating that the data was completely sent. A frame check sequence is used for commands and data that insures integrity of the data transfer. Remote unit 18 then drops carrier in line 80. Control unit 12 and remote unit 18 repeat lines 70–80 as often as necessary to transfer all information between remote unit 18 and control device 12.

Control device in line 82 after transferring all information, acknowledges that all information has completely been transferred by raising carrier in line 82, issuing a hang-up command in line 84 and dropping carrier in line 86. Both control unit 12 and remote unit 18 expect commands to be issued within a certain period of time, and if this timeout period is reached, the call is considered a failure.

Upon receipt of the hang-up command on line 84, remote unit 18 terminates the connection by generating an on-hook condition on line 88, and simultaneously control device 12 terminates the connection by generating and on-hook condition in line 90. The data transfer protocol is preferably half duplex, although other protocol's such as full duplex, or TCP/IP could be used as well to transfer data.

Figure 4:
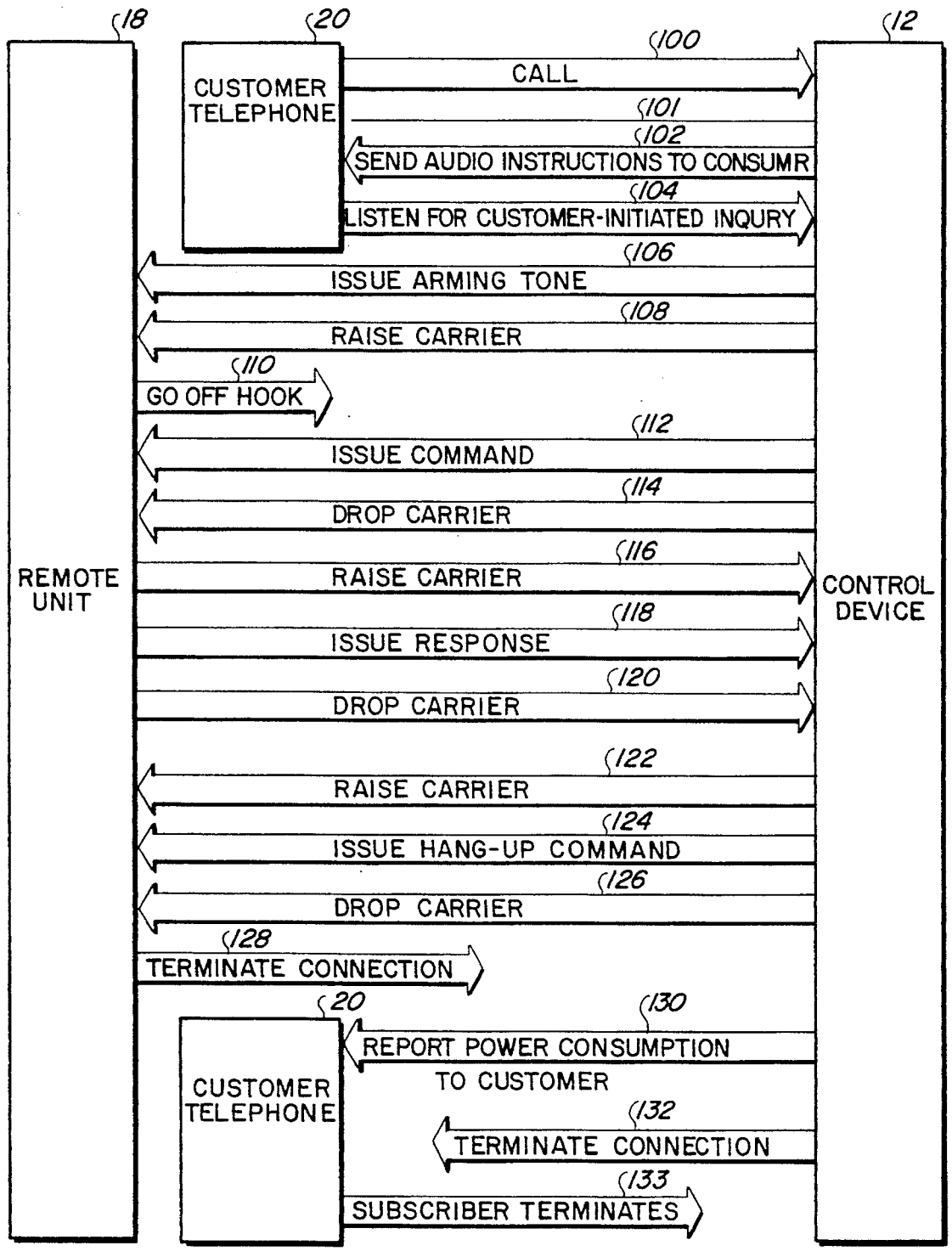
FIG. 4 is a diagram illustrating the protocol between a remote unit, telephone and the control device during a meter reading mode.

Referring to FIG. 4, there is shown a diagram illustrating another communications protocol between the remote unit 18 and the control device 12 via network 14. The subscriber uses this protocol on the telephone 20 to initiate communications and obtain information about its meter reading in the remote unit 18.

The protocol begins on line 100 with the subscriber dialing the control device 12 with telephone 20. Upon dialing the control device 12, the phone number of the remote unit 18a–18n which corresponds to the remote units address is preferably sent to the control device 12 by the network 14 using a telephone network automatic number indication (ANI). Control device 12 then answers the call in line 101 and sends an audio instruction to the subscriber on line 102. The subscriber listens to the message on telephone 20 and provides a response by audio, voice or depressing a keypad (not shown) on telephone 20 to send the subscriber commands to control device 12.

Control device 12 continues to listen to the subscriber initiated query and message on line 104. In response thereto device 12 sends more audio commands to the subscriber via telephone 20 on line 102 to indicate to the subscriber to depress certain buttons on the keypad. Although audio commands are the preferred method for transmitting information from the control device 12 to the subscriber, other methods such as video, modems, and facsimiles may be used as well.

Control device 12 in response to the subscriber's commands then issues a series of commands to remote unit 18 to retrieve information for the subscriber. The first of these series of commands is an arming tone (line 106). Arming tone is preferably a predetermined fixed frequency carrier recognizable by the remote unit 18. Control device then issues on line 108 a standard modem carrier signal on network 14. Remote unit 18 responds to the carrier signal by forcing a network "off-hook" tone on line 110.

Control device 12 responds to the "off-hook" tone by issuing a request command on line 112 and a drop carrier signal. Unit 18 acknowledges lines 112 and 114 by raising carrier on line 116, issuing a response on line 118 and dropping carrier on line 120. In issuing a response on line 118, unit 18 sends power readings to control device 12. Lines 112–120 are then repeated as necessary to permit unit 18 to transmit all information necessary to control device 12.

After all data is transferred between unit 18 and device 12, device 12 raises carrier on line 122, issues a hangup command on line 124 and drops carrier on line 126. Remote unit 18 then terminates its connection to network 14 by going on hook in line 128.

The control device 12 in line 130 reports a power consumption value to the remote unit 18 using an audio tone that can be recognized by the subscriber. Control device 12 then terminates its connection by a hang-up command on line 132. The remote unit 18 terminates its connection by hanging up network 44 on line 133.

Figure 6B:
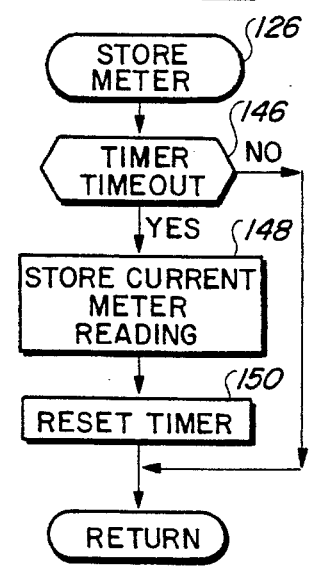
FIG. 6B is a flow diagram of process steps implementing a stored meter counter executed by the microcontroller.
Figure 6C:
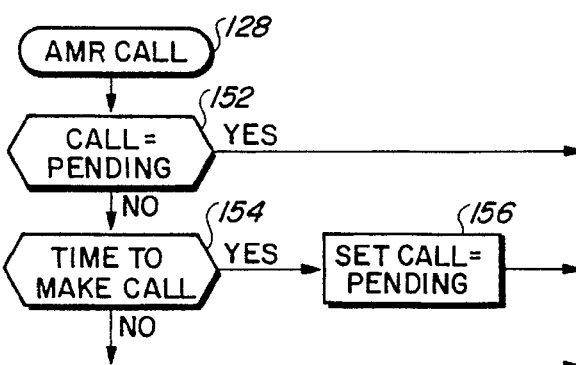
FIG. 6C is process steps to determine the time to call for the automatic meter reader implemented by the microcontroller.

Referring to FIG. 5, there is shown a flow diagram for series of routines executed by microcontroller 48 to effectuate the protocols in FIGS. 3 and 4. This series begins in step 120 where microcontroller 48 powers up. Next in step 122 microcontroller 48 initiates internal registers, LEDS, and timers. Microcontroller 48 then restores meter readings in routine 124, which is shown in FIG. 6A. It stores a meter counter in routine 126 (FIG. 6B), then determines a time to call for an automatic meter reading in routine 128 (FIG. 6C). Microcontroller 48 then executes routine 130 (FIG. 6D), where microcontroller 48 signals transmitter 38 to place a call to control device 12. Microcontroller 48 then in routine 131 (FIG. 6E) detects an arming tone and carrier sequence on network 14. Remote unit 18 places a call to control device 12 in routine 132 (FIG. 6F). After executing routine 132, routines 124–132 are repeated.

Referring to FIG. 6A, there is shown detect pulse transition routine 124 where the meter readings are deleted. In the first of these steps 124, the state of an LED (not shown) within sensor 36 is sensed. This LED indicates the current position of the interrupter on meter 34. This LED alternates back and forth from an "off state" to an "on state" as an interrupter rotates. In step 134 the current LED state is retrieved and a LED flag is set equal to the current LED state. The LED flag is compared against a previous LED flag which is initially set during power on to an "off-state" in step 136. If this LED flag equals the prior LED flag then microcontroller 48 returns to execute step 126. If the LED flag does not equal the prior LED flag, microcontroller 48 in step 138 determines whether the current LED flag is set to an "on-state", and the prior LED flag was set to an "off-state". When the current LED flag equals an "on-state", microcontroller 48 executes step 140. If the current LED is off, then microcontroller 48 executes step 142 in which the previous LED flag is set to off ending routine 124. In step 140 a meter counter is incremented in RAM within microcontroller 48. The microcontroller 48 then sets the previous LED flag to "on" in step 142 and returns.

Referring to FIG. 6B there is shown store meter counter routine 126. In routine 126, microcontroller 48 determines in step 146, whether timer 50 has timed out. If timer 50 has timed out, microcontroller 48 executes step 148. If timer 50 has not timed out, routine 126 ends. If timer 50 has timed out, microcontroller 48 executes step 148 and moves the current value of the meter located in RAM into EEProm 50. Microcontroller 48 then resets timer in step 150 and ends routine 126.

Referring to FIG. 6C there is shown determine AMR call timeout routine 128 in which microcontroller 48 determines whether to place a call to the control device to automatically meter previous reading. In routine 128, microcontroller 48 determines in step 152 whether a call to control device 12 is already scheduled or pending, and whether a previously placed call has failed. If a call is pending the microcontroller 48 ends sequence 128 and executes sequence 130. If the call is not pending, the microcontroller 48 determines in step 154 whether the automatic meter reading timer 50 has timed-out, thereby indicating it is time to make another call. If the timer has timed-out, the microcontroller 48 sets in step 156 a call pending flag to an "automatic meter reading" (AMR) state, indicating that a call is scheduled to be sent to the control device 12. Subsequent to step 156 or if the automatic meter reading timer 50 has not timed out in step 154, sequence 128 returns and sequence 130 is executed.

Figure 6D:
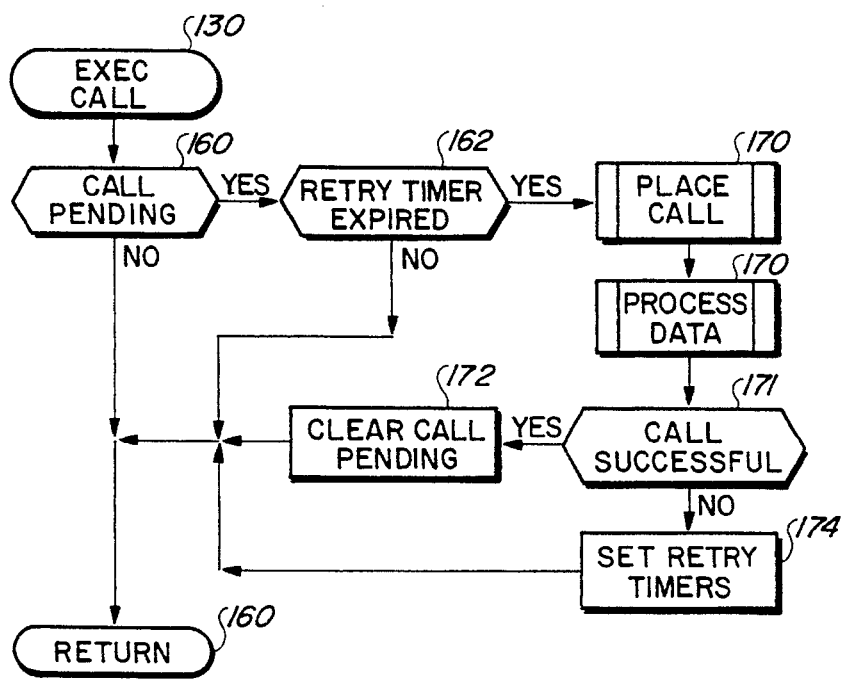
FIG. 6D is process steps to execute an automatic meter reader call by the microcontroller.

Referring to FIG. 6D, there is shown a call routine 130 where microcontroller 48 places an automatic meter reading call. Sequence 130 begins in step 160 by microcontroller 48 checking the call pending flag to see if it is a true state, i.e., equals AMR. If call pending flag equals AMR, microcontroller 48 determines whether retry timers have expired in step 162. If the retry timer has expired or if the recall pending flag equals AMR, then this sequence 128 ends. If the retry timer has expired, microcontroller 48 in step 168 initiates a network call to device 12.

In step 168 microcontroller 48 places a call to control device 12, and exchanges information including commands. Microcontroller 48 processes these commands in routine 170 which is described later in FIG. 7. Example commands includes reading the stored meter readings in the EEProm, reading the meter readings stored in RAM, storing the next time to place a call, programming various phone numbers to call, getting the status of the power meter and the status of power in the home, and hanging up the line.

After processing step 168, microcontroller 48 determine in step 171 whether a call was successfully placed. If the call was successful, the call pending flag is cleared, i.e., set to not AMR, in step 172 indicating not to retry the call. If the call was not successful, the microcontroller 48 in step 174 sets its internal retry timer and then ends routine 130.

Referring to FIG. 6E, there is shown routine 131 in which microcontroller 48 performs an arming tone and carrier detection. This routine begins in step 162 where the microcontroller 48 determines whether or not an arming tone has been detected on network line 14 by accessing detector 24. If an arming tone is not detected, routine 131 ends. If an arming tone is detected, microcontroller 48 determines whether or not a modem carrier tone has been detected in step 164. If a modem carrier tone is not detected, routine 131 ends, however, if a modem carrier tone is detected, microcontroller 48 executes step 166.

In step 166 microcontroller 48 feeds a signal to hookswitch 22 to take network 14 "off-hook". Microcontroller 48 then begins accepting data on network 14 and executes step 168.

In step 168 microcontroller 48 determines whether a "hang-up" command is received from network 14. If received, microcontroller 48 returns to end the arming tone detection routine 158. If a "hang-up" command is not received, but another command is received, microcontroller 48 in step 170 processes and receives data. Details of process data step 170 will be explained later in FIG. 7. Microcontroller 48 continues to execute steps 168 and 170 until a "hang-up" command is received. When a "hang-up" command is received, arming tone and carrier detection routine 131 ends.

Referring to FIG. 6F there is shown phone call routine 132 in which microcontroller 48 places a call to the control device 12. In the first step in routine 132, microcontroller 48 determines whether or not the arming tome has been detected from detector 24. If the arming tone has not been detected microcontroller 48 ends routine 132. However, if a call is to be placed then the microcontroller 48 dials control device 12 via network 14.

After dialing device 12 in step 174, microcontroller 48 determines in step 176 whether or not a carrier signal is received on network line 14. If a carrier signal is received, microcontroller 48 processes data in routine 170 as described later in FIG. 7. If microcontroller 48 has not received a carrier signal, then microcontroller 48 in step 178 determines whether or not a time-out has occurred in one of its internal timers. If a time-out has not occurred, microcontroller 48 re-executes step 176. However, if a time-out has occurred, a hangup step 182 is executed.

After processing data in sequence 170, microcontroller 48 determines whether a "hang-up" has been received from device 12 in step 180. If a "hang-up" command was not received, microcontroller 48 then re-executes the process data routine 170. If a microcontroller 48 received a "hang-up" command was it hangs up network 14 in step 182. Microcontroller 48 in hangup step 182 sends a signal to place phone hook-switch 22 in the "on-hook" position.

Figure 7:
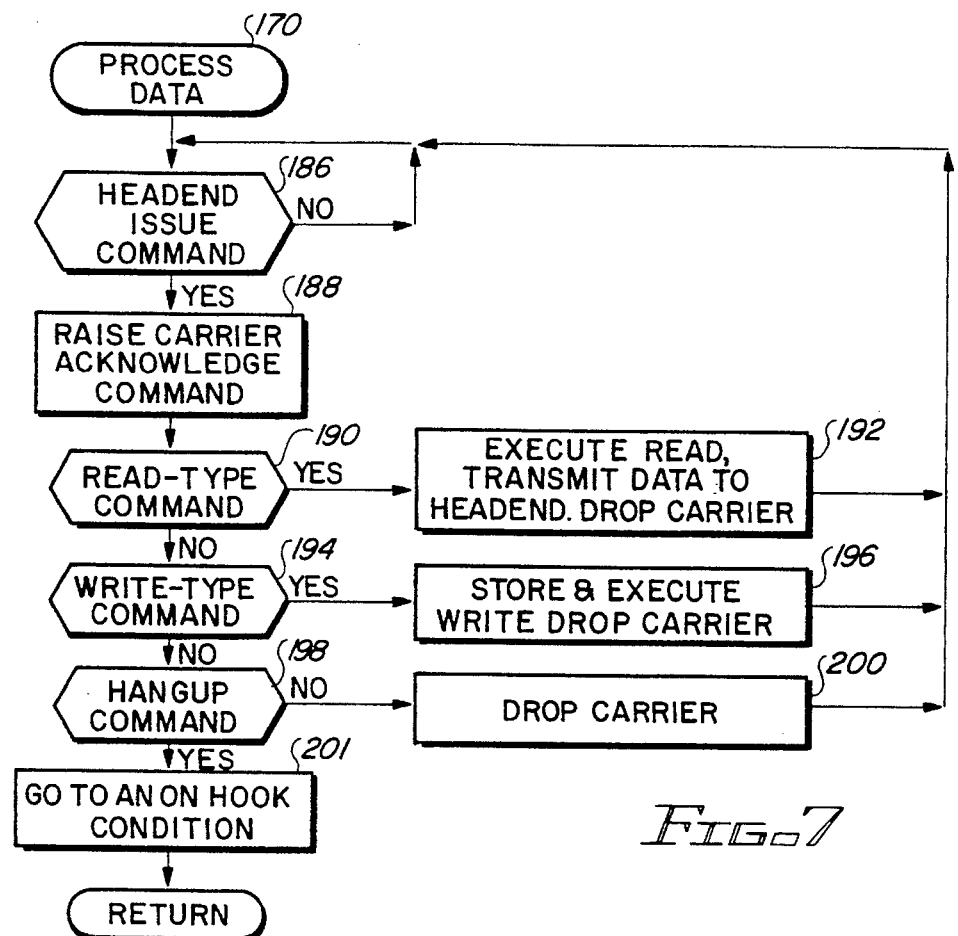
FIG. 7 is flow diagrams of the process data routine implemented by the microcontroller in FIGS. 6E and 6F.

Referring to FIG. 7, there is shown the process data flow diagram routine 170. In this routine 170 microcontroller 48 determines in step 186 whether or not device 12 has issued a command by polling network 14. If device 12 has issued a command, microcontroller 48 executes step 188. If device 12 has not issued a command, the microcontroller 48 continues to poll network 14 until a command is issued. In step 188, the microcontroller 48 raises carrier to acknowledge a command was issued to device 12. Next the microcontroller 48 in step 190 determines if the command from device 12 was a read type command. If it was, microcontroller 48 in step 192 reads the requested data from retry and transmits this data to device 12. Exemplary types of read type commands include provide meter readings value, phone number of subscriber, subscribers home power status.

In step 192 data is transmitted to the device 12 by microcontroller 48 using modem 54. If the command in step 190 was not a read type command, microcontroller 48 in step 194 determines if the command was a write type command. If it was, then microcontroller 48 in step 196 stores the write command information in its RAM. An exemplary write command is the date when the next call is to be placed by microcontroller 48 to control device 12.

If the command was not a write type command in step 194, microcontroller 48 determines in step 198 if the command was a hangup command. If it was not, microcontroller 48 drops carrier in step 200. After microcontroller 48 executes steps 192, 196 or 200, microcontroller 48 checks the next issued command in step 186.

If the command detected in step 198 was a hangup command, microcontroller 48 goes to an onhook condition in step 201. In step 201, microcontroller 48 feeds a signal to switch 22 to place network 14 on an onhook condition. After step 201 microcontroller 48 sequence 170 ends.

Figure 8:
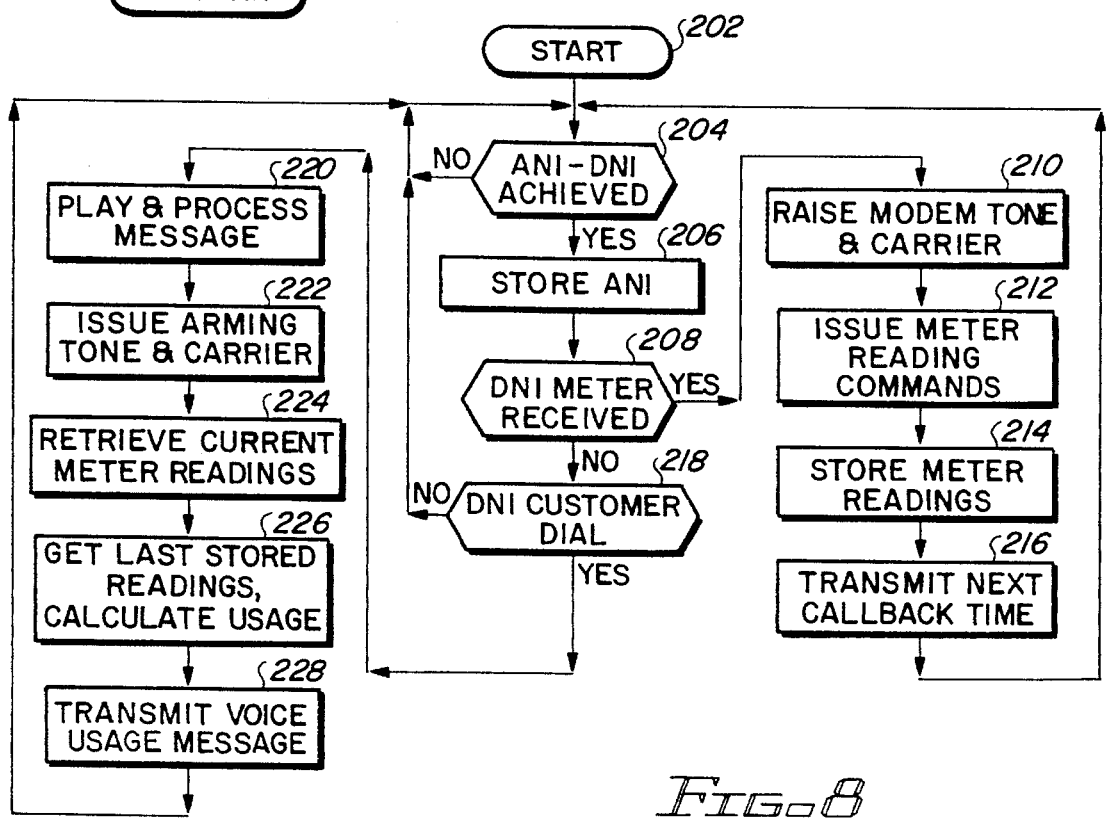
FIG. 8 is a flow diagram of process steps implemented by control device shown in 1.

Referring to FIG. 8, there is shown a flow chart of the routine 202 executed by the headend or control device 12. This routine 202 begins in step 204 where control device 12 receives a call from the remote unit 18 over network 14 and determines whether or not an ANI (Automatic Number Indication) and a DNI (Destination Number Indication) has been received. Then ANI is the phone number or address of the remote unit 18 or subscriber calling. The DNI is the phone number which was called by remote unit 18/subscriber. The ANI and DNI are typically generated by the local phone exchange. The subscriber and/or remote unit 18 may call a different number to signal a different function. For example, the remote device 18 may call phone number 555-1000 when it wants to provide meter reading (i.e. meter receive commands) information to this control device 12. The remote unit 18 may call 555-1001 when it wants to indicate to the remote device that there was a power outage. The subscriber may call a third number, i.e. 555-1002, if it wants to obtain billing information. When the customer wants to obtain billing information, the DNI will indicate a customer dial tone. Once the DNI and ANI numbers have been received, the device 12 executes step 200. However, if the DNI or DNI has not been received, control device 12 continues to monitor the network line 14 until the numbers are received.

In step 206, the headend 12 stores in memory the ANI and DNI number. Next in step 208, control device 12 determines whether or not the DNI is the designation for a meter receive command. If the DNI equals the meter receive command, then steps 210–216 are executed. If the DNI does not equal the meter receive command, then the control device 12 determines in step 218 whether or not the DNI equals a subscriber dial tone (i.e. DNI=555-1002).

In step 210 the control device 12 raises the modem tones and then generates the special carrier number tones that was previously discussed. A meter read command is issued onto the network by control device 12 in step 212. Remote unit 18 then sends the meter readings on to network 14. The readings are stored by control device 12 into memory in step 214. The control device 12 would then send in step 216 to the remote unit a value indicating next time that the meter reading is to be sent by the remote unit 18. The remote unit 18 contains an internal clock with a default callback timer. If this next time value corresponding to a predetermined time period (typically 30 days) is not sent, remote unit 18 will automatically dial up the control device 12 within the predetermined period of time. Next the control device 12 executes step 204.

Control device 12 in step 218 determines whether or not the DNI equals the customer dial tone. If it does control device 12 executes steps 220–228. If the DNI does not equal the customer dial tone, device 12 re-executes step 204. In step 220 the control device plays and processes the message to the subscriber. An arming tone is issued and carrier is raised in step 222 for the previously discussed purpose. Next step 224 device 12 retrieves and deletes the current meter reading from remote unit 18 with commands using the protocol sequence previously defined.

Next in step 226 the control device 12 gets the last stored reading of the meter and calculates usage, i.e., power consumption values. This power consumption value is calculated by determining the difference between the initial power meter reading and the recently detected power reading. Once the power consumption value is determined, a rate is computed by looking up in a predetermined "look-up" table, the current rates based on total power consumption in a home. A rate table is downloaded into the control device 12 by the utility company. This rate is then multiplied by the difference between the initial power meter reading and the detected power reading to compute a usage. Next in step 228, the calculated power consumption and usage is transmitted using the voice processing card 28 to the subscriber.

Although a voice processing card is one device that transmits the signal from the control device 12 to the subscriber, other devices and techniques may be used such as facsimiles, video signals, teletype, video monitor signals, modem signals, etc. After steps 216 or 228, routine 202 then begins again in step 204. Power consumption is one type of information that may be provided to the subscriber, other types of information may be provided as well. Other exemplary information that can be provided to the subscriber include weather, time, advertising, news information.

While the principles of the invention have been made clear in the illustrated embodiments, there will be immediately obvious to those skilled in the art, many modifications are structured arrangements proportions, elements, materials, and components used in the practice of the invention, in otherwise which are particularly adapted for specific environments and operational requirements, without departing from those principals. The appended claims are therefore intended to cover and embrace any such modifications within the limits only of the true spirit and scope of the invention.

We claim:

1. An apparatus for indicating power consumption to a subscriber in response to commands provided by the subscriber, the apparatus comprising:

a remote unit including:
   (a) a sensor detecting power readings of an electronic power meter;
   (b) a transmitter providing the detected power readings onto the network;

a control device including:
   (a) a receiver receiving commands provided by a subscriber and receiving the provided power readings from the network;
   (b) a computer computing a power consumption value in response to the received power readings; and
   (c) an indicator circuit responsive to the computer and providing the computed power consumption value onto the network to the subscriber.

2. The apparatus as recited in claim 1 further comprising a telephone coupled to the network and responsive to the provided computed power consumption value for providing an audio indication of the consumption volume.

3. The apparatus as recited in claim 1 wherein said computer includes a memory storing an initial power meter reading and the detected power readings; and wherein said computer computes the power consumption value as a function of the difference between the initial power meter reading and the detected power reading.

4. The apparatus as recited in claim 1 further comprising a telephone coupled to the network having a depressible keypad and a tone-generating circuit which feeds a tone onto the network in response to keys depressed on the keypad, and wherein the subscriber provides commands onto the network by depressing the keypad.

5. The apparatus as recited in claim 4 wherein the indicator feeds the power readings onto the network in response to the tones fed onto the network.

6. The apparatus as recited in claim 4, wherein the computer provides a power reading request signal in response to the commands received by the receiver; wherein the control device further comprises a second transmitter operative to feed the power ready request signal over the network to the control unit; and wherein the transmitter provides the detected power readings onto the network in response to the power ready request signal.

7. A method for indicating power consumption to a subscriber over an electronic network in response to commands provided by the subscriber, the method including the steps of:

detecting with a remote unit power readings of a subscriber's electric power meter;

feeding the detected power readings onto the network;

transmitting with a remote device subscriber commands onto the network;

detecting with a control device the subscriber commands and issuing request commands onto the network in response to the subscriber commands;

computing with the control device a power consumption value from the detected power readings fed onto the network; and providing the power consumption value to the subscriber over the network.

8. The method as recited in claim 7 wherein the remote device transmits the subscriber commands onto the network with a touch tone telephone.

9. The method as recited in claim 7 further comprising the step of determining with the control device an address of the subscriber when the subscriber transmits commands onto the network.

10. The method as recited in claim 7 wherein the remote device is generating an off-hook signal with the remote unit when transmitting the detected power reading; and transmitting the detected power readings only when the off-hook signal is generated and the request commands are generated.

11. The method as recited in claim 7 further comprising the steps of generating with the control device a next time call signal and feeding the next time call signal to the remote units, detecting the next time call signal with the remote unit and accessing the remote unit over the network after a first predetermined time period corresponding to the next time call signal.

12. The method as recited in claim 11 further comprising the step of accessing with the remote unit the control device after a first predetermined time period if the next time call signal is not detected by the remote unit within a second predetermined time period.

13. The method as recited in claim 7 further comprising the step of periodically storing in a memory location in the control device the detected power readings.

14. The method as recited in claim 13 further comprising the step of computing with the control device the power consumption value by subtracting detected power readings fed onto the network from the power readings stored in the memory location.

15. A system for indicating power consumption to a subscriber over an electronic network in response to commands provided by the subscriber using a telephone, the system comprising:

a remote unit including:
(1) a sensor detecting power readings of an electronic power meter;
(2) a first transmitter circuit connected to the network and responsive to an arming tone, a carrier signal, and a request command signal;

a control device including:
(1) a receiver circuit receiving the arming tone, the carrier signal, the command signals, and the detected power readings provided by the subscriber;
(2) a computer responsive to the received command signals provided by the subscriber for generating the request signal command, and responsive to the received power readings for generating a power consumption value; and
(3) a second transmitter circuit feeding the request signal command to the remote unit via the network and feeding the power consumption value to the subscriber via the network.

16. The system as recited in claim 15 wherein the second transmitter circuit further comprises an audio circuit transforming the power consumption value into an audio signal, and an audio transmitter that feeds the audio signal to the subscriber via the network.

17. The system as recited in claim 15 further comprising a telephone that generates tones to permit the subscriber to provide commands, and wherein the computer responds to the tones by generating the request signal command.

18. The system as recited in claim 15 wherein the control device includes a memory periodically storing the received power readings; and wherein the computer generates the power consumption value as a function of the received power readings and the stored power readings.

19. The system as recited in claim 18 wherein the memory includes a table containing information regarding power consumption rate and wherein the power consumption value is determined by multiplying the power consumption rate by the difference between the received and stored power readings.

20. The system as recited in claim 15 wherein said remote unit includes a command processor which periodically stores power readings of the electric power meter in the remote unit memory and which periodically provides an indication to call the control device over the network; and wherein said first transmitter circuit periodically feeds stored power readings to the control device in response to the indication.

21. The system as recited in claim 20 wherein said first transmitter circuit feeds the stored power readings onto the network to the control device in response to the request command signal.

* * * * *